Nov. 9, 1954  G. A. FINK  2,693,990
RECORDER FOR ELECTRICAL QUANTITIES
Filed June 3, 1952  2 Sheets-Sheet 1
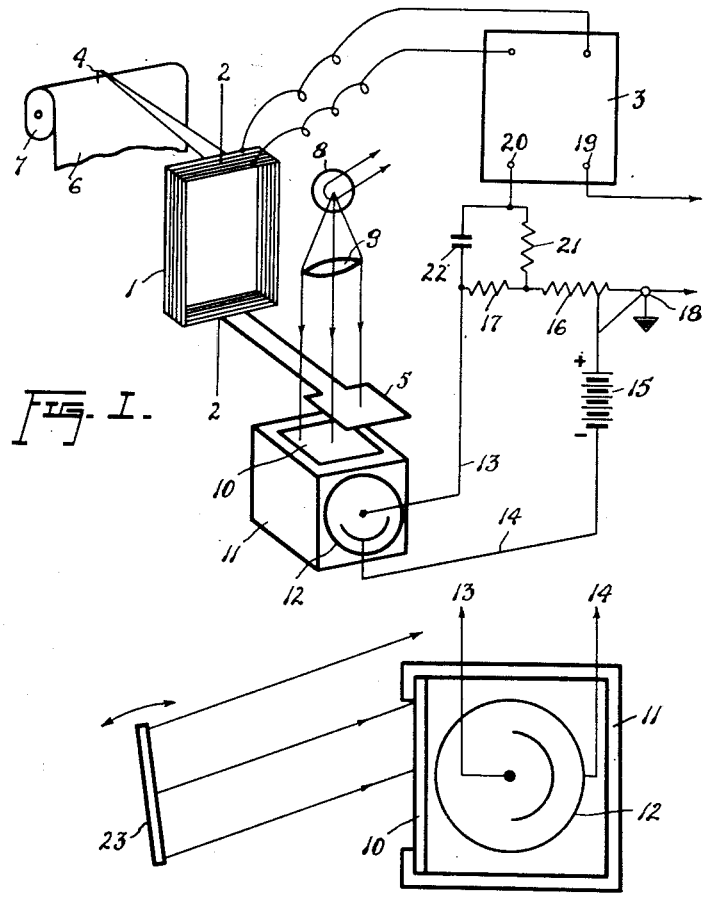
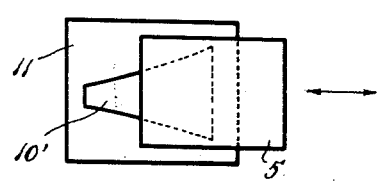
INVENTOR
George A. Fink
BY  A. John Michel
ATTORNEY Nov. 9, 1954  G. A. FINK  2,693,990
RECORDER FOR ELECTRICAL QUANTITIES
Filed June 3, 1952  2 Sheets-Sheet 2
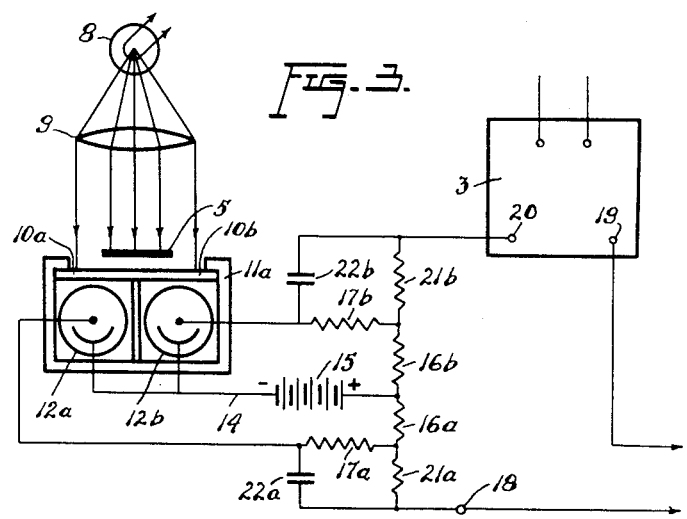
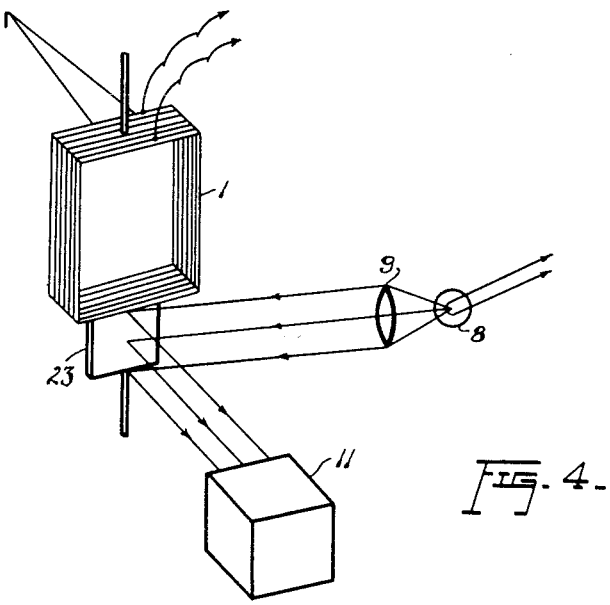
INVENTOR
George A. Fink
BY A. John Michel
ATTORNEY

2,693,990
RECORDER FOR ELECTRICAL QUANTITIES

George A. Fink, Burlington, Iowa

Application June 3, 1952, Serial No. 291,417

14 Claims. (Cl. 346—32)

The present invention relates to recorders for electrical quantities, such as currents and potentials.

One object of this invention is to provide a direct-writing recorder capable of accurately recording rapidly varying values, in particular, to extend the frequency response of the recorder to higher frequencies than those obtainable with known methods, while retaining good response to steady input quantities.

Another object of this invention is to provide means for suppressing hunting or overshooting, thus giving good transient response.

A further object of the present invention is to produce a recorder which may be easily given an arbitrary recording characteristic, or arbitrary relation between the electrical quantity to be recorded and the recorded coordinate, or position of the recording stylus.

Previously known direct-writing recorders have generally been of two types: (1) the direct-deflection type, using a moving coil, piezoelectric crystal, or magnetic drive for the recording stylus or pen, and (2) the servo-operated type in which a primary moving element, such as a galvanometer coil, is held to an essentially zero deflection by a feedback system, and some part of the feedback system is provided with means for recording, and frequently also is provided with means for controlling some quantity or process.

Recorders of the first type have rather limited sensitivity and speed, while the piezoelectric crystal type will not record steady values different from zero. Also, these recorders cannot have their recording characteristics easily changed. The second type is more sensitive and accurate, but is much slower. My invention combines the advantages of both of these types, having the sensitivity and accuracy of the servo-operated type along with speed at least as high as that of the direct-deflection type.

My invention uses an amplifier and photoelectric means, actuated by a moving coil in a feedback loop to control the position of the moving coil in accordance with the electrical quantity being recorded. Some known recorders, such as that described in Reissue Patent No. 20,476, use photoelectric feedback devices, but they are used for keeping the deflection of the moving coil to an essentially zero value, while my invention keeps the net input voltage to an amplifier essentially zero, and makes the deflection of the coil essentially equal to some desired function of the quantity to be recorded.

The present invention is similar to my copending application Serial No. 58,410, filed November 5, 1948, in that the position of the moving coil of a recorder is controlled by feedback. In that invention the feedback voltage is generated by a bridge circuit whose arms are strain-sensitive resistors mounted on a member deformable by movement of the coil. The photoelectric method of feedback used in the present invention will accomplish the same purpose, impose less restraint on the moving coil, and allow of easy change of recording characteristic.

The above and other features and objects of my invention will be apparent from the following description of certain embodiments thereof, reference being made to the accompanying drawing in which Fig. 1 is a schematic diagram of one form of the invention adapted to linear recording of signals of one polarity;

Fig. 2 shows a modification of the optical system of Fig. 1 to give non-linear response;

Fig. 3 shows a modification of the apparatus shown in Fig. 1, with two photocells and networks to allow operation on either polarity of a signal;

Fig. 4 shows a modification of the optical system of Fig. 1, using a mirror in place of a shutter to vary the amount of light reaching the phototube; and Fig. 4A is another view of the optical system of Fig. 4, showing how rotation of the mirror varies the amount of light reaching the photocell.

In the form of my invention shown in Fig. 1, a moving coil 1 is supported by bearings or suspensions 2, of negligible restoring torque, and its terminals are connected to the output terminals of an amplifier 3. Fixed to the coil, and rotating with it, are two arms, one carrying a stylus 4 and the other carrying a shutter or vane 5. The stylus is adapted to record in any known manner, as for example on a strip of paper 6, as it passes over a roll 7. The shutter is arranged to intercept light from a lamp 8 and condenser lens 9 projected toward a diffusing window 10 in a box 11 containing a phototube 12. The anode lead 13 and the cathode lead 14 from the phototube are connected to a network containing, in series, a battery 15 and two resistors 16 and 17. The junction of the battery and resistor 16 is connected to one of the terminals to which the input signal is applied. This terminal may be grounded, as shown. The other signal input terminal 19 is one of the input terminals of an amplifier designed for differential input, i. e. one which is sensitive to a difference of potential between its input terminals. The other input terminal 20 of the amplifier is connected to the junction of resistors 16 and 17 by means of resistor 21, and to the junction of resistor 17 and anode lead 13 by means of a capacitor 22.

To understand the operation of a recording device constructed as described above, consider first the zero condition with no signal voltage applied to terminals 18 and 19, and with the coil and shutter in position to intercept all the light projected by lens 9 toward window 10. There will then be no phototube current flowing through resistors 16 and 17, and no voltage drop in them. The net input to the amplifier will then be zero, and hence also the output will be zero, so that no current will be flowing through coil 1, and no torque will be acting on it. The whole system is then in a state of equilibrium.

If a difference of potential is applied to terminals 18 and 19, terminal 18 being positive with respect to 19, the net input to the amplifier will no longer be zero, and an output current will flow from the amplifier through the moving coil. This current will react with the magnetic field in which the coil is mounted to produce a torque that will rotate the coil with its attached stylus and shutter. Motion of shutter 5 will uncover window 10, allowing light to strike the window and illuminate the cathode of the phototube. A photocurrent approximately proportional to the area of window 10 which has been uncovered will then flow through resistors 16 and 17, producing a voltage drop in them proportional to the photocurrent, and hence proportional to the rotation of the shutter, coil, and stylus. The voltage drop in resistor 16 will be of the proper polarity to oppose a negative input signal as assumed, and the potential difference at the amplifier input will be decreased. This action will continue until the voltage drop in resistor 16 is equal in magnitude to the applied signal, when the system will again be in equilibrium if the coil 1 is not rotating.

If the coil is rotating in direction to increase the photocurrent, the voltage drops in resistors 16 and 17 will be increasing and the "differentiating" circuit composed of resistor 21 and capacitor 22 will apply to the amplifier input terminal 20 a voltage approximately proportional to the rate of change of the voltage drop in resistor 17, in addition to the voltage drop in resistor 16. This added voltage will unbalance the amplifier input and cause current to flow from the amplifier output through coil 1 in the direction to oppose the coil motion. Thus, a damping effect is obtained whose magnitude can be adjusted by varying the ratio of resistor 17 to resistor 16, and the time constant of the differentiating circuit 21, 22 may be adjusted to fit the dynamic characteristics of coil 1 and amplifier 3 in order to produce optimum damping. With optimum damping the recorder will attain equilibrium after a change of input voltage as rapidly as possible without overshooting.

For each value of input voltage within the range of the recorder there will be a position of the coil, stylus, and shutter system at which the voltage drop in resistor 16, due to photocurrent through it, will balance the input and produce equilibrium. With the optical system shown in Fig. 1, the motion of the stylus will be linearly proportional to the input voltage.

To obtain non-linear response, the modification shown in Fig. 2 may be used. The shape of the window 10' is changed so that its width in a direction measured radially outward from the axis of the coil is no longer constant. The area of window 10' uncovered at a given position of the shutter, coil, and stylus, is made proportional to the value of input voltage required at that position for the recorder to follow a specified characteristic.

In order to be able to record signals of both polarities, the optical system and coupling network may be modified as shown in Fig. 3. The lamp 8, lens 9 and shutter 5 are arranged as in Fig. 1, but two phototubes 12a, 12b are provided in a box 11a with two windows 10a and 10b, and the coupling network is duplicated. The phototube cathodes are connected by conductor 14 to the negative terminal of a common battery 15, and the anodes are connected through equal networks 16a, 17a, 21a, 22a and 16b, 17b, 21b and 22b, similar to the single network in Fig. 1, to the positive terminal of battery 15.

The zero position of shutter 5 is now such that equal areas of the windows 10a and 10b are uncovered. In this position, assuming phototubes 12a, 12b have equal sensitivities, the photocurrents will be equal, and the voltage drops in resistors 16a and 17a will be equal, respectively, to the voltage drops in resistors 16b and 17b. The polarities are seen to be such that the potential difference between terminals 18 and 20 is zero, so that the system will be in equilibrium with zero input.

When the shutter 5 moves in one direction from its zero position, it uncovers more of one window, and less of the other, increasing the photocurrent from one phototube, and decreasing that from the other. The voltage drops in resistors 16a and 17a will no longer equal that in resistors 16b and 17b, so that the potential difference between terminals 18 and 20 is no longer zero. The system will be in equilibrium now if the input voltage is equal to the potential difference between 18 and 20 and has a polarity such that the net input to amplifier 3 is zero. If the signal polarity is reversed, there will be another equilibrium position with shutter 5 on the opposite side of its zero position. The coil motion will be damped as equilibrium is aproached just as in the arrangement shown in Fig. 1, since similar coupling networks are used.

A further modification is shown in Figs. 4 and 4a, in which a mirror 23 fastened to the coil 1 takes the place of the shutter in the arrangement of Figs. 1, 2 and 3. Lamp 8 and lens 9 project a beam of light toward the mirror 23 from which the beam is reflected toward a box 11 containing a diffusing window and phototube as shown in Fig. 1. Fig. 4a is another view of part of the optical system of Fig. 4, looking parallel to the axis of the coil, which shows how the rotation of the mirror changes the amount of light falling on the window 10, and thus varies the photocurrent from phototube 12. The circuit connected to the output of the phototube assembly 11 may be the same as in Fig. 1 or 3. The operation is similar to that of the arrangement shown in the preceding figures, and it will be apparent that a modification corresponding to Fig. 2 may be made.

While the invention has been described with reference to certain specific embodiments, it is to be understood that the same have been given merely by way of illustration, and not as a limitation upon the scope of the invention as defined in the appended claims.

I claim:

1. A recorder comprising an amplifier having a pair of input terminals, means for impressing an input signal on said amplifier, electromechanical transducing means connected to the output of said amplifier, recording means actuated by said transducing means, photoelectric means, optical means connected to said transducing means for illuminating said photoelectric means said transducing means controlling said optical means to produce and maintain for the duration of an input signal an amount of illumination corresponding to the amplitude of the input signal, an output circuit means connected to said photoelectric means for impressing between said amplifier input terminals the output voltage of the photoelectric means in series with the input signal but with a polarity opposite to the polarity of the input signal.

2. A recorder according to claim 1, wherein the transducing means includes a galvanometer coil and means for supporting said coil for rotary movement with negligible restoring force.

3. A recorder according to claim 1, wherein the optical means includes a light, a shutter interposed between said light and said photoelectric means, said shutter being attached to said transducing means for movement therewith to vary the amount of light on the photoelectric means in accordance with the position of said transducing means.

4. A recorder according to claim 1, wherein the optical means includes a light and a mirror mounted on said transducing means for reflecting light onto said photoelectric means.

5. A recorder comprising an amplifier having a pair of input terminals, means for impressing an input signal on said amplifier, electromechanical transducing means connected to the output of said amplifier, recording means actuated by said transducing means, photoelectric means, optical means connected to said transducing means for illuminating said photoelectric means in accordance with the position of said transducing means, an output circuit connected to said photoelectric means, said output circuit including means for impressing between said amplifier input terminals a voltage in series with the input signal but having a polarity opposite to the polarity of the input signal, and means for supporting said transducing means with a negligible restoring force, whereby said voltage has a magnitude substantially equal to the magnitude of the input signal at the rest position of said transducing means.

6. In an electrical recording device, the combination of: two signal input terminals, an electrical amplifier sensitive to differences of potential between its two input terminals, with the first of said amplifier input terminals connected to the first of said recorder input terminals, electromechanical transducing means connected to the output of said amplifier, recording means actuated by said transducing means, a light source, photoelectric means, optical means actuated by said transducing means for varying the amount of light transmitted from said light source to said photoelectric means in accordance with the position of said transducing means, a source of electric current, a first resistor and a second resistor connected in series with said source and said photoelectric means, with the second of said recorder input terminals connected to the junction of said source and said first resistor, a third resistor connected from the junction of said first resistor and said second resistor to the second of said amplifier input terminals, and a capacitor connected from the second of said amplifier input terminals to the junction of said second resistor and said photoelectric means.

7. In an electrical recording device, the combination of: two signal input terminals, an electrical amplifier sensitive to differences of potential between its two input terminals, with the first of said amplifier input terminals connected to the first of said recorder input terminals, electromechanical transducing means connected to the output of said amplifier, recording means actuated by said transducing means, a light source, a first photoelectric device and a second photoelectric device each having at least two electrodes, optical means for varying the amount of light striking said two photoelectric devices differentially in accordance with the position of said transducing means, a source of electric current having one terminal connected to like ones of said electrodes, a first resistor and a second resistor connected in series with said current source and said first photoelectric device, a third resistor and a fourth resistor connected in series with said current source and said second photoelectric device, a fifth resistor connected from said second recorder input terminal to the junction of said first resistor and said second resistor, a first capacitor connected from said second recorder input terminal to the other electrode of said first photoelectric device, a sixth resistor connected from said second amplifier input terminal to the junction of said third resistor and said fourth resistor, a second capacitor connected from said second amplifier input terminal to the other electrode of said second photoelectric device.

8. A recorder according to claim 7, wherein the transducing means includes a galvanometer coil and means for supporting said coil for rotary movement with negligible restoring force.

9. A recorder according to claim 7, wherein the optical means includes a light, a shutter interposed between said light and said photoelectric means, said shutter being attached to said transducing means for movement therewith to vary the amount of light on the photoelectric means in accordance with the position of said transducing means.

10. A recorder according to claim 7, wherein the optical means includes a light and a mirror mounted on said transducing means for reflecting light onto said photoelectric means.

11. A system comprising an amplifier having a pair of input terminals, means for impressing an input signal on said amplifier, electromechanical transducing means connected to the output of said amplifier, photoelectric means, optical means connected to said transducing means for illuminating said photoelectric means in accordance with the position of said transducing means, an output circuit means connected to said photoelectric means for impressing the output voltage of the photoelectric means between said amplifier input terminals to provide a voltage in series with the input signal but having a polarity opposite to the polarity of the input signal.

12. A system comprising an amplifier having a pair of input terminals, means for impressing an input signal on said amplifier, electromechanical transducing means connected to the output of said amplifier, photoelectric means, optical means connected to said transducing means for illuminating said photoelectric means in accordance with the position of said transducing means, an output circuit connected to said photoelectric means, said output circuit including means for impressing between said amplifier input terminals a voltage in series with the input signal but having a polarity opposite to the polarity of the input signal, and means for supporting said transducing means with a negligible restoring force, whereby said voltage has a magnitude substantially equal to the magnitude of the input signal at the rest position of said transducing means.

13. In an electrical system the combination of two signal input terminals, an electrical amplifier sensitive to differences of potential between its two input terminals, with the first of said amplifier input terminals connected to the first of said signal input terminals, electromechanical transducing means connected to the output of said amplifier, a light source, photoelectric means, optical means actuated by said transducing means for varying the amount of light transmitted from said light source to said photoelectric means in accordance with the position of said transducing means, a source of electric current, a first resistor and a second resistor connected in series with said source and said photoelectric means, with the second of said signal input terminals connected to the junction of said source and said first resistor, a third resistor connected from the junction of said first resistor and said second resistor to the second of said amplifier input terminals, and a capacitor connected from the second of said amplifier input terminals to the junction of said second resistor and said photoelectric means.

14. In an electrical system, the combination of: two signal input terminals, an electrical amplifier sensitive to differences of potential between its two input terminals, with the first of said amplifier input terminals connected to the first of said signal input terminals, electromechanical transducing means connected to the output of said amplifier, a light source, a first photoelectric device and a second photoelectric device each having at least two electrodes, optical means for varying the amount of light striking said two photoelectric devices differentially in accordance with the position of said transducing means, a source of electric current having one terminal connected to like ones of said electrodes, a first resistor and a second resistor connected in series with said current source and said first photoelectric device, a third resistor and a fourth resistor connected in series with said current source and said second photoelectric device, a fifth resistor connected from said second signal input terminal to the junction of said first resistor and said second resistor, a first capacitor connected from said second signal input terminal to the other electrode of said first photoelectric device, a sixth resistor connected from said second amplifier input terminal to the junction of said third resistor and said fourth resistor, a second capacitor connected from said second amplifier input terminal to the other electrode of said second photoelectric device.

References Cited in the file of this patent

UNITED STATES PATENTS

| Number | Name | Date |
|---|---|---|
| 1,822,075 | Aronoff | Sept. 8, 1931 |
| 2,077,451 | Wilson et al. | Apr. 20, 1937 |
| 2,113,436 | Williams, Jr. | Apr. 5, 1938 |
| 2,243,456 | Dulter | May 27, 1941 |
| 2,367,614 | Rich | Jan. 16, 1945 |
| 2,507,301 | Fulbright | May 9, 1950 |
| 2,547,662 | Rich et al. | Apr. 3, 1951 |